Nov. 27, 1951     C. N. LAWTER     2,576,762
FRAME CONSTRUCTION FOR TURBOJET ENGINES
Filed Feb. 4, 1948     2 SHEETS—SHEET 1
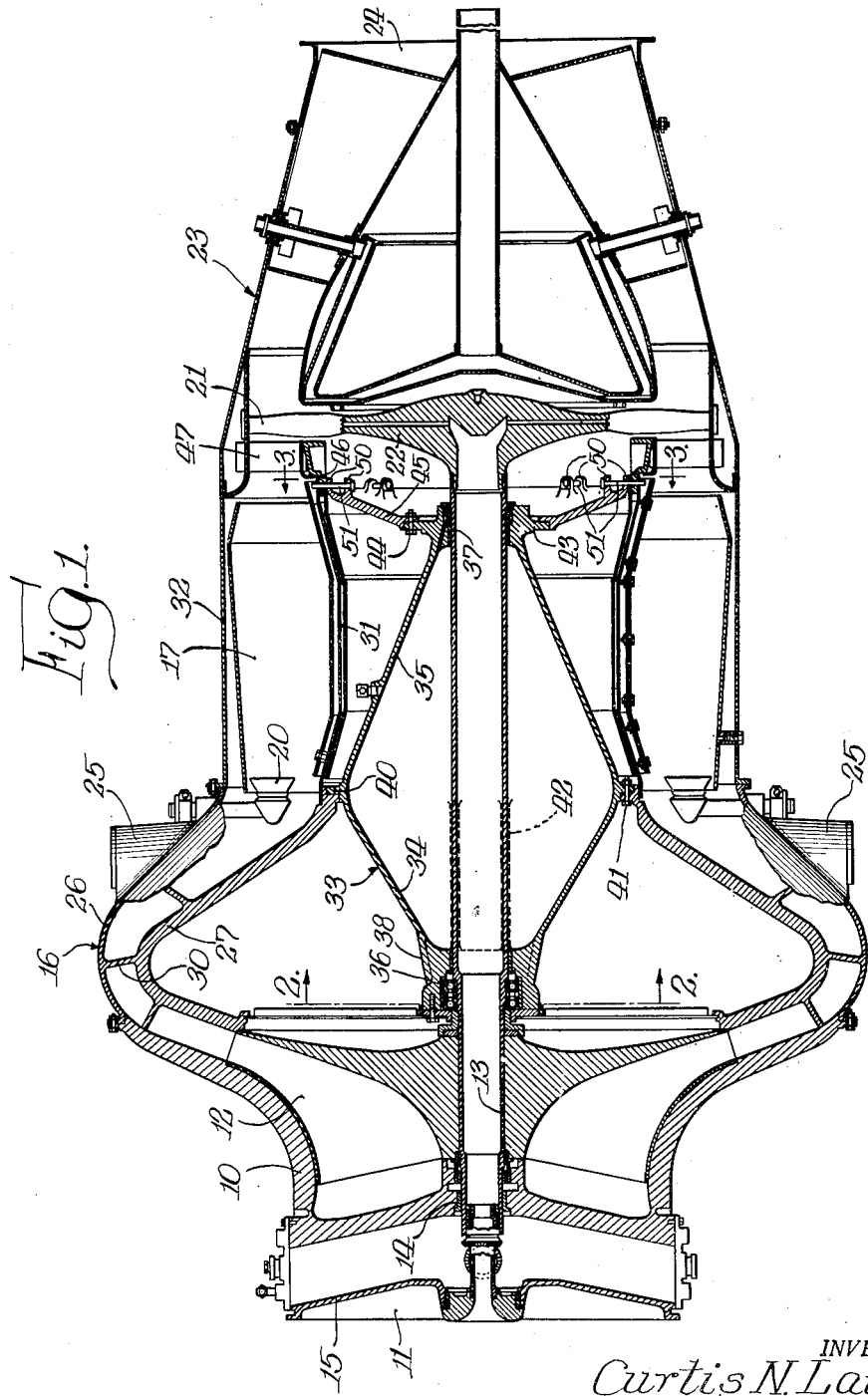
INVENTOR.
Curtis N. Lawter,
BY
Davis, Lindsey, Hibben & Noyes
Attys.

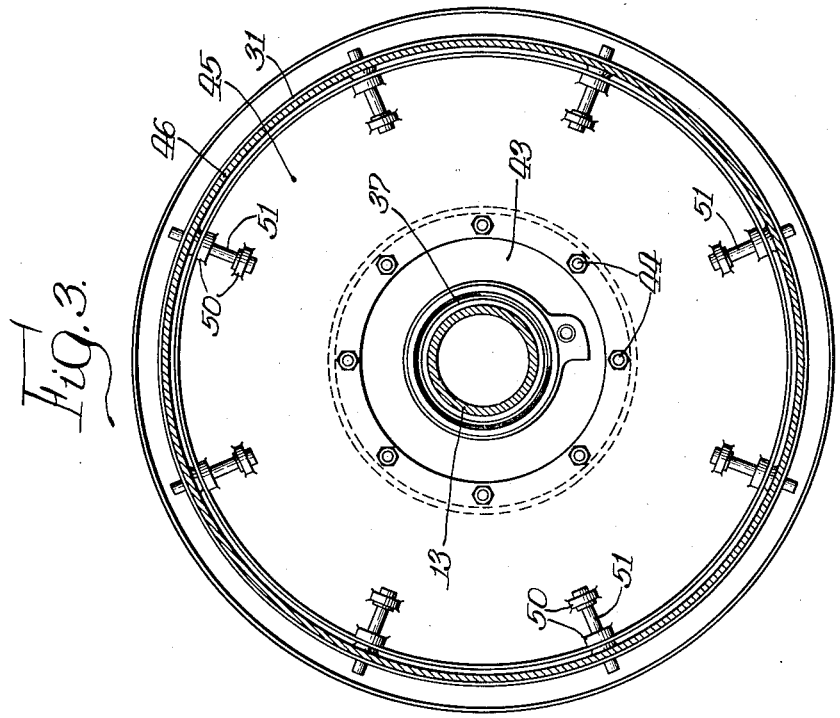
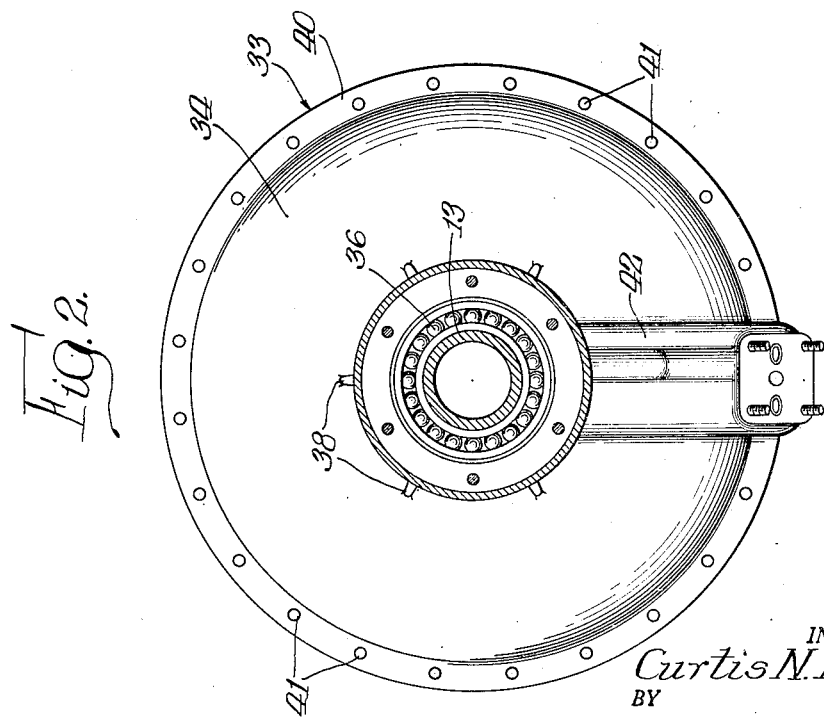

Patented Nov. 27, 1951

2,576,762

UNITED STATES PATENT OFFICE 2,576,762

FRAME CONSTRUCTION FOR TURBOJET ENGINES

Curtis N. Lawter, Trenton, N. J., assignor to Packard Motor Car Company, Detroit, Mich., a corporation of Michigan Application February 4, 1948, Serial No. 6,318

1 Claim. (Cl. 60—39.31)

The invention relates generally to a turbo-jet engine and more particularly to a frame construction therefor.

The general object of the invention is to provide a novel frame structure for a turbo-jet engine, the frame structure serving to carry the drive shaft connecting the turbine with the air compressor and to provide a rigid structure to which various parts of the casing structure may be secured.

Another object is to provide a novel frame structure of the foregoing character, which provides the necessary rigidity for support of the drive shaft and casing structure, and which is of relatively light weight and may be easily manufactured.

Still another object is to provide a frame structure of the foregoing character, which minimizes the gyroscopic moment of the turbine on the internal structure of the engine.

Other objects and advantages will become apparent from the following description taken in connection with the accompanying drawings, in which:

Figure 1 is a horizontal longitudinal sectional view through a turbo-jet engine having a frame construction embodying the features of the invention.

Fig. 2 is a front elevational view of the frame structure shown in longitudinal section in Fig. 1, as viewed substantially from the line 2—2 of Fig. 1.

Fig. 3 is a transverse sectional view taken substantially on the line 3—3 of Fig. 1.

A turbo-jet engine of the character herein contemplated is illustrated in Fig. 1 and is shown as comprising an inlet cover 10 having a central front opening or eye 11 through which air is drawn in by a rotary compressor 12, the compressor 12 being located within the inlet cover 10. The compressor 12 is mounted on a main shaft 13 axially positioned within the engine and having its front end journaled in a bearing 14 supported by struts 15 extending radially within the inlet opening 11. The air drawn inwardly by the compressor 12 is discharged radially with an axial component into a diffuser passage provided by a diffuser section 16. From the diffuser 16 the air is discharged into an annular combustion chamber section 17 where the fuel is supplied by means of burners 20. The power stream generated in the combustion chamber section 17 is discharged rearwardly therefrom to act on turbine blades 21 carried on a turbine rotor 22. The main shaft 13 extends rearwardly from the air compressor 12 and, at its rear end, supports the turbine rotor 22. The turbine rotor 22 and the air compressor 12 are thus directly connected. The turbine, of course, absorbs a portion of the energy in the power stream emerging from the combustion chamber section 17 to provide power for driving the air compressor 12. The power stream, after passing through the turbine blades 21, flows into a tail cone, indicated generally at 23, from which the power stream emerges through an opening 24 at the rear end thereof to form the jet.

An engine of this character is, of course, adapted to be mounted in the body of an aircraft, and to provide for such mounting, the diffuser section 16, which is in the form of a rigid casting, may be provided on its exterior with a pair of diametrically opposite mounting lugs 25. The diffuser section 16 comprises an outer wall 26 and an inner wall 27 connected by flow-controlling vanes 30 lying in the passage provided by the space between the inner and outer walls 26 and 27. The inlet cover 10 is secured at its rear end to the diffuser section 16 so as to provide a rigid connection therebetween. The combustion chamber section 17 preferably comprises a sheet metal casing structure including an inner wall 31 and an outer wall 32. The tail cone 23 is similarly formed from sheet metal and constitutes a continuation of the combustion chamber section 17.

To support the main shaft 13 so that the air compressor 12 is properly positioned within the inlet cover 10 and the turbine rotor 22 is held in proper relation to the annular combustion chamber, and to provide rigid support for the sheet metal casing structure forming the combustion chamber 17, a main frame, indicated generally at 33, is provided, which forms a backbone for the engine as a whole. Generally described, the main frame 33 is secured to the rigid diffuser section 16 and is provided with suitable bearings for supporting the main shaft 13. The main frame is of elongated form and projects rearwardly so that one of the bearings is located adjacent the turbine rotor 22 to give adequate support therefor. The combustion chamber section 17 is supported at its front end by the diffuser section 16 adjacent the point of attachment of the latter to the main frame 33, and at its rear end the combustion chamber section 17 is provided with additional support extending from the rear end of the main frame adjacent the turbine rotor 22. The main frame is in the form of a rigid casting which may be generally described as comprising a pair of truncated cones positioned base to base with the diffuser section 16 and the front end of the combustion chamber section 17 located at the point where the bases of the two cones meet intermediate the ends of the main frame 33. With the main frame 33 constructed in the manner herein disclosed, the effect of the gyroscopic force of the turbine rotor 22 on the internal structure of the engine is minimized by the fact that it acts through a relatively short lever arm.

Referring to the details of structure of the main frame 33, in Fig. 1, where a longitudinal section of the frame is shown, it is apparent that the frame comprises a pair of truncated conical portions 34 and 35, the cones being positioned base to base with the small ends of the cones constituting the ends of the frame member. In the present instance, the rear cone portion 35 is shown as having a greater axial length than the front cone portion 34. The frame member is hollow and its ends provide support for the main shaft 13. Thus, as is clearly illustrated in Fig. 1, I provide a bearing 36 in the front end of the frame member 33, which preferably is in the form of a thrust bearing to take up the thrust imposed on the main shaft 13 by the turbine rotor 22. Stiffening ribs 38 may be formed on the frame member adjacent the bearing 36 to provide adequate support therefor. The rear end of the main frame member 33 carries a bearing 37 which is of the type providing for radial support of the shaft 13.

Intermediate the ends of the main frame 13, I provide a peripheral flange 40 thereon for securing the rear end of the diffuser section 16 thereto. In the present instance, the inner wall 27 of the diffuser section 16 is shown as being secured to the flange 40 by means of a plurality of circumferentially spaced bolts 41. The inner wall 31 of the combustion chamber section is mounted on the inner wall 27 of the diffuser section 16, while the outer wall 32 of the combustion chamber section is secured to the outer wall 26 of the diffuser section 16. Thus, the main frame member is bulged outwardly intermediate its ends to connect with the diffuser section 16, and since the latter carries the mounting lugs 25 by which the engine as a whole is supported, the main frame thus provides a rigid support for the main shaft 13 and the sheet metal casing structure comprising the combustion chamber section 17 and the tail cone 23. The front cone portion 34 of the frame member may be provided with a channel-shaped bulge, shown at 42 in Figs. 1 and 2, to form a sump for oil supplied to the bearings 36 and 37 and collecting within the frame member 33.

At the rear end of the main frame member 33 adjacent the bearing 37, a support is provided for the rear end of the combustion chamber section 17. For this purpose, the main frame is provided with a peripheral flange 43 at its rear end. Secured to the flange 43, as by bolts 44, is a disc-like member constituting a dished diaphragm 45 extending outwardly and toward the turbine rotor 22. Secured to the periphery of the diaphragm 45 is a ring member 46 carrying nozzle blades 47 for directing the power stream from the combustion chamber section 17 at the proper angle to the turbine blades 21. The ring member 46 is secured to the diaphragm 45 in a manner which holds them in truly concentric relationship but, because of the fact that the ring member 46 is subjected to the high heat of the power stream, relative expansion between the ring member and the diaphragm member takes place. To this end, the diaphragm, adjacent its periphery, is provided with pairs of lugs 50 having radially aligned apertures to receive radially positioned pins 51 extending outwardly through the ring member 46. The pins 51 thus hold the ring member and diaphragm concentric to one another, but, should the ring member expand, it is free to slide outwardly on the pins 51. The rear end of the inner wall 31 of the combustion chamber section 17 is mounted on the ring member 46 and consequently is supported from the rear end of the frame member 33.

From the foregoing description, it is apparent that the main frame member 33 supports the shaft 13 and, since the main frame member 33 is connected to the diffuser section 16 carrying the mounting lugs 25, a rigid support from the external mounting of the engine is provided for the parts. The sheet metal casing structure forming the combustion chamber section 17 is supported at its front end by the diffuser section and at its rear end by the diaphragm 45, so that the combustion chamber section 17 is properly held in concentric relation to the turbine rotor 22.

I claim:

In a turbo-jet engine, a one-piece elongated hollow frame member circular in cross section and bulged outwardly intermediate its ends, a rigid shaft extending through said frame member and journaled in the ends thereof, a turbine rotor mounted on one end of said shaft and an air compressor on the other end, a rigid annular casting providing an air diffuser section having its rear end extending about and directly secured to the bulged portion of said frame member and flaring forwardly therefrom, an annular sheet metal combustion chamber section secured to said casting in concentric relation therewith and extending rearwardly therefrom, a rigid supporting diaphragm secured to the rear end of said frame member and supporting the combustion chamber section rearwardly of said casting, and supporting members rigidly formed on and extending radially from said rigid casting adjacent its rear end for supporting the engine.

CURTIS N. LAWTER.

REFERENCES CITED

The following references are of record in the file of this patent:

UNITED STATES PATENTS

| Number | Name | Date |
| --- | --- | --- |
| 2,432,359 | Streid | Dec. 9, 1947 |
| 2,435,836 | Johnson | Feb. 10, 1948 |
| 2,439,273 | Silvester | Apr. 6, 1948 |
| 2,445,114 | Halford | July 13, 1948 |